(12) United States Patent
Seals et al.

(10) Patent No.: US 7,869,408 B2
(45) Date of Patent: Jan. 11, 2011

(54) TECHNIQUE FOR OUTPUT POWER DITHERING FOR IMPROVED TRANSMITTER PERFORMANCE

(76) Inventors: Michael J. Seals, 3870 Shady Run Rd., Melbourne, FL (US) 32934; Adam K. Harriman, 498 Firestone St., Palm Bay, FL (US) 32905

( * ) Notice: Subject to any disclaimer, the term of this patent is extended or adjusted under 35 U.S.C. 154(b) by 1010 days.

(21) Appl. No.: 10/779,606

(22) Filed: Feb. 18, 2004

(65) Prior Publication Data

US 2005/0180359 A1 Aug. 18, 2005

(51) Int. Cl.
*H04W 4/00* (2009.01)
(52) U.S. Cl. .................. 370/333; 370/318; 455/522
(58) Field of Classification Search ........... 370/333, 370/318; 455/522
See application file for complete search history.

(56) References Cited

U.S. PATENT DOCUMENTS

| 6,741,866 | B1 * | 5/2004 | Gustavsson | 455/522 |
|---|---|---|---|---|
| 7,082,107 | B1 * | 7/2006 | Arvelo | 370/311 |
| 2003/0109274 | A1 * | 6/2003 | Budka et al. | 455/522 |
| 2004/0015765 | A1 * | 1/2004 | Cooper et al. | 714/750 |
| 2004/0248609 | A1 * | 12/2004 | Tamura | 455/522 |
| 2005/0097409 | A1 * | 5/2005 | Shin et al. | 714/704 |
| 2006/0182030 | A1 * | 8/2006 | Harris et al. | 370/230 |
| 2007/0021071 | A1 * | 1/2007 | Brouwer | 455/69 |

\* cited by examiner

*Primary Examiner*—Barry W Taylor

(57) ABSTRACT

A technique for admission control of packet flows is disclosed. In one particular exemplary embodiment, the technique may be realized as a method for output power dithering for improved transmitter performance. The method may comprise transmitting a plurality of packets at a first output power, determining a first error rate associated with the transmission of the plurality of packets at the first output power, transmitting the plurality of packets at at least one second output power different from the first output power, determining at least one second error rate associated with the transmission at the at least one second output power, and identifying a desired output power based at least in part on a comparison between the first error rate and the at least one second error rate.

18 Claims, 2 Drawing Sheets

TECHNIQUE FOR OUTPUT POWER DITHERING FOR IMPROVED TRANSMITTER PERFORMANCE

FIELD OF THE INVENTION

The present invention relates generally to wireless telecommunications and, more particularly, to a technique for output power dithering for improved transmitter performance.

BACKGROUND OF THE INVENTION

In telecommunication, an error vector magnitude (EVM) represents the difference between a measured carrier magnitude and phase at a point in time, and the expected magnitude and phase at that same point in time. EVM is typically measured to quantify the amount of degradation or distortion in a digital signal. The effect of EVM degradation can be attributed to a variety of reasons such as phase noise, compression point, IQ balance, T/R pulling distortion, AM variations, and FM variations, some of which have a dependency on the following external time-changing factors such as temperature, supply voltage, load pulling by an antenna, and antenna proximity to materials that affect its impedance. For wireless transmissions at relatively high data rates (e.g., up to 54 Mbps under the IEEE 802.11g standard), high output power coming from the transmitter tends to compress the power amplifier output and degrade the EVM enough to compromise the link quality. At these high data rates, increasing transmitter power in a properly designed compression point limited system usually decreases the range of effective transmission because of the increased EVM degradation caused by over-driving the power amplifier.

Many solutions have been proposed to control the effects of EVM degradation caused by antenna load variation. These solutions are typically hardware based, potentially expensive, and may not eliminate the problem but only reduce the impact. For example, the most obvious solution to antenna load shifting is to incorporate an isolator between the power amplifier and the antenna. Apart from causing insertion loss, this solution is too cumbersome and too expensive for a wireless local area network (WLAN) radio. To account for the effects of varying voltage and/or temperature, some hardware designers include sensors and calibration in the transmitter. The most common sensor is a voltage detector. However, the antenna load tends to shift due to its proximity to external materials. The antenna load shifts impact the power amplifier's compression point causing EVM distortion and therefore degrading the link quality. The antenna load shifts also degrade the system performance by adjusting the voltage to power calibration by changing the power amplifier load line. The result is an inability for the voltage detector to accurately control the output power in relation to the power amplifier's compression point. This uncertainty requires an excessive power reduction from the normal operational point to account for these errors. The IEEE 802.11 Task Group k is currently looking into techniques that attempt to improve link performance, but those techniques require feedback from the receiver to adjust the transmitter. In addition, those techniques are developed to minimize interference to neighboring networks, not to directly improve the transmitter performance or link quality.

In a transmitter design, the power amplifier compression typically dominates the signal distortion. Thus it would be a good practice to balance the power amplifier distortion with the ability of a receiver to cope with that distortion. Most standards bodies adopt a minimum quality metric for the transmitted signal. For the IEEE 802.11 case, the chosen metric is EVM. A transmitter is manufactured to operate above a minimum EVM level over all operating conditions including wide ranges of temperature, supply voltage and antenna load. Such configuration mandates a removal of the signal away from the power amplifier's compression point by reducing the output power by a margin to account for these external factors. Unfortunately, this margin may significantly impact the total output power of the transmitter, reducing its overall range for nominal operating conditions.

In view of the foregoing, it would be desirable to provide an efficient and cost effective solution for counteracting EVM degradation that overcomes the above-described inadequacies and shortcomings.

SUMMARY OF THE INVENTION

According to the present invention, a technique for output power dithering for improved transmitter performance is provided. In one particular exemplary embodiment, the technique may be realized as a method for output power dithering for improved transmitter performance. The method may comprise transmitting a plurality of packets at a first output power, determining a first error rate associated with the transmission of the plurality of packets at the first output power, transmitting the plurality of packets at at least one second output power different from the first output power, determining at least one second error rate associated with the transmission at the at least one second output power, and identifying a desired output power based at least in part on a comparison between the first error rate and the at least one second error rate.

In accordance with another exemplary embodiment of the present invention, the technique may be realized as a method for output power dithering for improved transmitter performance. The method may comprise transmitting a plurality of packets at a first output power, determining a first error rate associated with the transmission of the plurality of packets at the first output power, transmitting the plurality of packets at a second output power if the first error rate is greater than a predetermined error rate value, wherein the second output power is different from the first output power, determining a second error rate associated with the transmission at the second output power, and adjusting the second output power if the second error rate is lower than the first error rate.

In accordance with yet another exemplary embodiment of the present invention, the technique may be realized by a system for output power dithering for improved transmitter performance. The system may comprise a transmitter that transmits a plurality of packets at a first output power, and a processor that determines a first error rate associated with the transmission of the plurality of packets at the first output power, causes the transmitter to transmit the plurality of packets at at least one second output power, determines at least one second error rate associated with the transmission at the at least one second output power, and identifies a desired output power based at least in part on a comparison between the first error rate and the at least one second error rate.

In accordance with still another exemplary embodiment of the present invention, the technique may be realized by a system for output power dithering for improved transmitter performance. The system may comprise means for transmitting a plurality of packets at a first output power, means for determining a first error rate associated with the transmission of the plurality of packets at the first output power, means for transmitting the plurality of packets at at least one second output power different from the first output power, means for determining at least one second error rate associated with the transmission at the at least one second output power, and means for identifying a desired output power based at least in part on a comparison between the first error rate and the at least one second error rate.

In accordance with a further exemplary embodiment of the present invention, the technique may be realized by computer readable medium having code for causing a processor to perform output power dithering for improved transmitter performance. The computer readable medium may comprise code adapted to transmit a plurality of packets at a first output power, code adapted to determine a first error rate associated with the transmission of the plurality of packets at the first output power, code adapted to transmit the plurality of packets at at least one second output power different from the first output power, code adapted to determine at least one second error rate associated with the transmission at the at least one second output power, and code adapted to identify a desired output power based at least in part on a comparison between the first error rate and the at least one second error rate.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

Figure 1:
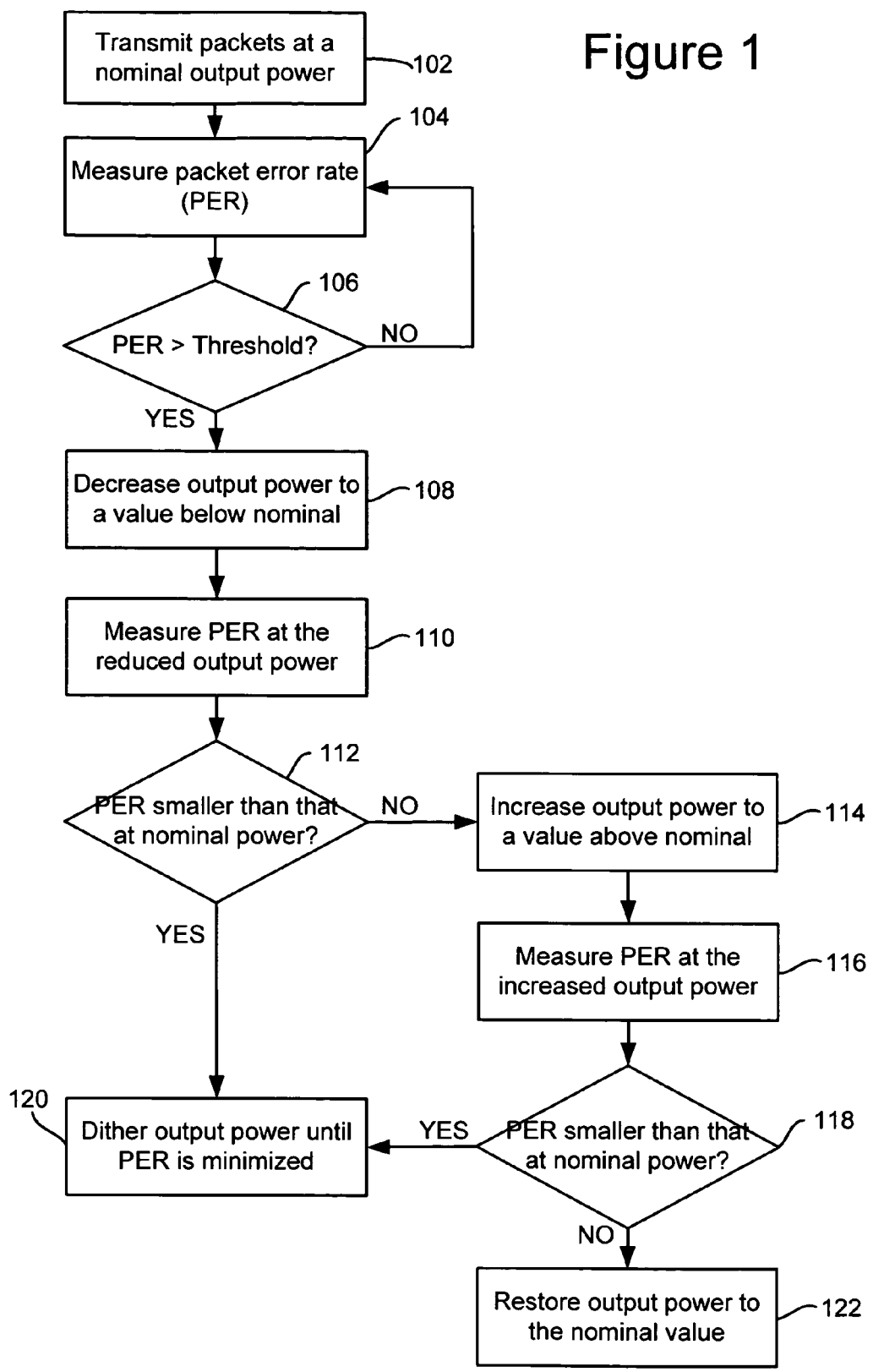
FIG. 1 is a flow chart illustrating an exemplary method for output power dithering for improved transmitter performance in accordance with an embodiment of the present invention.

Referring to FIG. 1, there is shown a flow chart illustrating an exemplary method for output power dithering for improved transmitter performance in accordance with an embodiment of the present invention.

The exemplary method starts in step 102, where a plurality of signal packets may be transmitted at a nominal output power. The transmission may be performed by a wireless transceiver operating at an output power that has been calibrated and/or optimized for normal network conditions. As with most packet-based systems, the transmission data rates may be varied. Failed packets may be retransmitted until successfully received or until a timer expires. To improve the likelihood of a successful transmission, the data rate may be lowered on each of the retransmission attempts.

In step 104, a packet error rate (PER) may be measured. A packet error occurs when acknowledgment of a transmitted packet is not received correctly. The PER may be measured, for example, by counting the number of packet errors that occur over a predetermined time interval. If, however, the number of packets transmitted in the time interval is less than a predetermined minimum number, a statistically accurate PER may not be determined.

If a PER has been measured in step 104, then in step 106 it may be determined whether the PER is higher than a predetermined threshold value. If so, the process may branch to step 108. Otherwise, the process may loop back to step 104 where the PER may continue to be monitored. The threshold value is typically associated with the data rate at which the PER is measured.

In the event that a PER exceeds the threshold, the transmitter's output power may be decreased, in step 108, to a value below the nominal. For example, the new output power may be approximately one decibel (dB) below the nominal value.

In step 110, when the transmitter is operating at the reduced output power, additional PER statistics may be collected over another small period of time. If there are not enough packets transmitted in this period of time to facilitate PER measurements, the output power may be restored to its nominal value and the process may restart from step 102.

If a new PER has been measured in step 110, it may be determined, in step 112, whether the new PER is smaller than the PER at nominal power as determined in step 104. If the new PER is smaller compared with that at nominal power, the transmitted signal distortion may be the cause of link failures. In that case, the process may branch to step 120 where the output power may be further adjusted based on the responsive changes in PER. According to an embodiment of the invention, the output power may be dithered in small steps, both up and down, until the corresponding PER is minimized or within a desired range.

If the new PER is the same or greater than that at nominal power, either signal-to-noise ratio (SNR) or signal-to-interference ration (SIR) may be dominating the link failures and transmitter distortion is probably not the cause of the high PER. Therefore, in step 114, the output power may be increased to a value above the nominal.

In step 116, another PER may be determined while the transmitter is operating at the increased power. If there are not enough packets transmitted in this period of time, the output power may again be restored to its nominal value.

If a new PER has been measured in step 116, it may be determined in step 118 whether this new PER is smaller than that at nominal power. If the new PER is smaller, that confirms either SNR or SIR as the real cause of link failures. Then the output power may be further adjusted in step 120 to achieve a minimized or desired PER. If the new PER is the same or greater than that at the nominal power, the output power may be restored to its nominal value in step 122.

Figure 2:
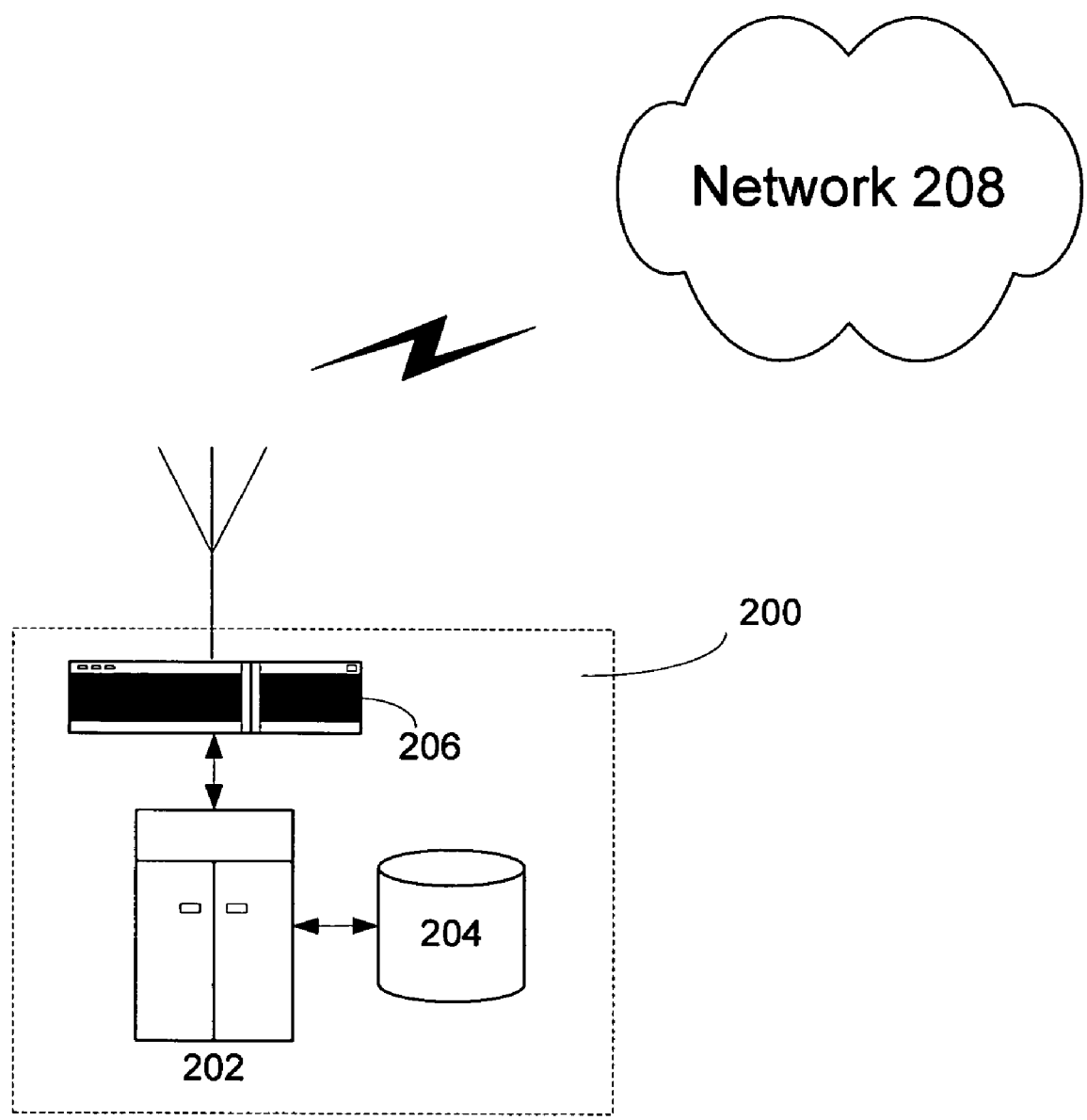
FIG. 2 is a block diagram illustrating an exemplary system for output power dithering for improved transmitter performance in accordance with an embodiment of the present invention.

Referring to FIG. 2, there is shown a block diagram illustrating an exemplary system (System 200) for output power dithering for improved transmitter performance in accordance with an embodiment of the present invention. The System 200 may be a network element (e.g., a switch, router or wireless access point) that communicates with Network 208. The System 200 typically comprises a processor module 202, a storage module 204 and a transceiver module 206. The processor module 202 may be a central processing unit (CPU), micro-controller or computer with packet-processing and hardware-control functions. The storage module 204 may be a storage device, such as a semiconductor memory, non-volatile memory, hard drive disk, CD-ROM or similar, that is accessible by the processor module 202. Storage module 204 may hold data records associated with the packet error rates and transceiver output powers. The transceiver module 206 may be capable of transmitting signal packets and receiving acknowledgements of the packets. In operation, the processor module 202 may dynamically monitor the packet error rates and control the output power and data rate of the transceiver module 206 in accordance with the exemplary method described above.

Functionalities in accordance with the above-described exemplary method may be achieved without physical modification to existing network hardware. Instead, the output power dithering method in accordance with the present invention may be implemented through firmware upgrades. Furthermore, there is no requirement for equipment at both ends of a wireless communication to implement the output power dithering method as described above. In fact, such method may be implemented on only one end. Most existing systems aimed at accomplishing this function typically require special communications between both ends to agree on a common upgrade.

Further, the method for dithering output power according to the responsive changes in packet error rate may be implemented in a number of ways different from the above described embodiments. For example, the transmission may be attempted at a number of different output powers, from which a power setting that corresponds to the lowest error rate may be selected. Such selected power setting may be used directly for subsequent transmissions. Or it may be used as the nominal power described above which serves as a starting point for further link optimization.

At this point it should be noted that the technique for output power dithering for improved transmitter performance in accordance with the present invention as described above typically involves the processing of input data and the generation of output data to some extent. This input data processing and output data generation may be implemented in hardware or software. For example, specific electronic components may be employed in a computer and communications network or similar or related circuitry for implementing the functions associated with output power dithering for improved transmitter performance in accordance with the present invention as described above. Alternatively, one or more processors operating in accordance with stored instructions may implement the functions associated with output power dithering for improved transmitter performance in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

The invention claimed is:

1. A method for adjusting output power for a transmitter, the method comprising:
    determining whether a first error rate associated with a transmission of a plurality of packets at a first output power exceeds a threshold error rate;
    responsive to the first error rate exceeding the threshold error rate, transmitting the plurality of packets at a second output power, wherein the second output power is less than the first output power;
    determining whether a second error rate associated with the transmission of the plurality of packets at the second output power is less than the first error rate; and
    responsive to the second error rate being less than the first error rate, dithering the output power for the transmitter below the first output power until a target error rate is achieved.

2. The method of claim 1, further comprising initially determining the first error rate by measuring a number of failed acknowledgments of transmitted packets.

3. The method of claim 1 further comprising, responsive to the second error rate being greater than the first error rate:
    transmitting the plurality of packets at a third output power, wherein the third output power is greater than the second output power;
    determining a third error rate associated with the transmission at the third output power;
    if the third error rate is less than the first error rate, then dithering the output power for the transmitter above the first output power until a target error rate is achieved; and
    if the third error rate is greater than the first error rate, then restoring the first output power as the output power for the transmitter.

4. The method of claim 3:
    wherein dithering the output power for the transmitter below the first output power until a target error rate is achieved comprises adjusting the output power up and down in steps until the target error rate is achieved, wherein, at each step, the output power for the transmitter is less than the first output power; and
    wherein dithering the output power for the transmitter above the first output power until a target error rate is achieved comprises adjusting the output power up and down in steps until the target error rate is achieved, wherein, at each step, the output power for the transmitter is greater than the first output power.

5. A method for adjusting output power for a transmitter, the method comprising:
    transmitting a plurality of packets at a first output power;
    determining a first error rate associated with the transmission of the plurality of packets at the first output power;
    comparing the first error rate to a predetermined error rate value; and
    responsive to the first error rate being greater than the predetermined error rate value, transmitting the plurality of packets at a second output power, wherein the second output power is less than the first output power;
    determining a second error rate associated with the transmission at the second output power;
    transmitting the plurality of packets at a third output power, wherein the third output power is greater than the second output power;
    determining a third error rate associated with the transmission at the third output power; and
    based at least in part on a comparison between the first error rate the second error rate, and the third error rate, setting the output power for the transmitter.

6. The method of claim 5, wherein setting the output power for the transmitter comprises, if the second error rate is less than the first error rate and the third error rate, adjusting the second output power until a desired error rate is reached.

7. The method of claim 5, wherein setting the output power for the transmitter comprises, if the third error rate is less than the first error rate and the second error rate, adjusting the third output power until a desired error rate is reached.

8. The method of claim 5, wherein determining the first error rate comprises measuring a number of failed acknowledgments of transmitted packets.

9. The method of claim 5, wherein the transmission at the first output power is associated with a variable data rate.

10. The method of claim 9, wherein the first error rate, the second error rate, the third error rate, and the predetermined error rate value are associated with the variable data rate.

11. The method of claim 5, wherein the transmission at the first output power, the second output power, and the third output power is associated with a variable data rate.

12. The method of claim 11, wherein the first error rate, the second error rate, the third error rate, and the predetermined error rate value are associated with the variable data rate.

13. A system for adjusting output power for a transmitter, the system comprising:
a transmitter configured to transmit a plurality of packets at a first output power; and
a processor configured to:
determine a first error rate associated with the transmission of the plurality of packets at the first output power;
determine whether the first error rate is greater than a predetermined error rate;
responsive to the first error rate being greater than the predetermined error rate, cause the transmitter to transmit the plurality of packets at a second output power, wherein the second output power is less than the first output power;
determine a second error rate associated with the transmission at the second output power;
cause the transmitter to transmit the plurality of packets at a third output power, wherein the third output power is greater than the output power;
determine a third error rate associated with the transmission at the third output power; and
identify a desired output power based at least in part on a comparison between the first error rate, the second error rate, and the third error rate.

14. A system for adjusting output power for a transmitter, the system comprising:
means for transmitting a plurality of packets at a first output power;
means for determining a first error rate associated with the transmission of the plurality of packets at the first output power;
means for, in response to the first error rate being greater than a predetermined error rate, transmitting the plurality of packets at a second output power, wherein the second output power is less than the first output power;
means for determining a second error rate associated with the transmission at the second output power;
means for transmitting the plurality of packets at a third output power, wherein the third output power is greater than the first output power;
means for determining a third error rate associated with the transmission at the third output power; and
means for identifying a desired output power based at least in part on a comparison between the first error rate, the second error rate, and the third error rate.

15. The system of claim 14, further comprising:
means for identifying, the second output power as a desired output power if the second error rate is lower than at least the third error rate; and
means for identifying the third output power as the desired output power if the third error rate is lower than at least the second error rate.

16. The system of claim 14, wherein the plurality of packets is transmitted in accordance with an IEEE 802.11 protocol.

17. A tangible computer readable storage medium encoded with instructions capable of being executed by a computer to adjust output power for a transmitter adjusting for improved transmitter performance, wherein the instruction, when executed, cause the computer to perform operations comprising:
transmitting a plurality of packets at a first output power;
determining a first error rate associated with the transmission of the plurality of packets at the first output power;
in response to the first error rate being greater than a predetermined error rate, transmitting the plurality of packets at a second output power, wherein the second output power is less than the first output power;
determining a second error rate associated with the transmission at the second output power,
transmitting the plurality of packets at a third output power, wherein the third output power is greater than the first output power;
determining a third error rate associated with the transmission at the third output power; and
identifying a desired output power based at least in part on a comparison between the first error rate, the second error rate, and the third error rate.

18. A method for adjusting output power for a transmitter, the method comprising:
determining whether a first error rate associated with a transmission of a plurality of packets at a first output power exceeds a threshold error rate;
responsive to the first error rate exceeding the threshold error rate, transmitting the plurality of packets at a second output power, wherein the second output power is less than the first output power;
determining a second error rate associated with the transmission at the second output power;
based at least in part on a comparison of the first error rate and the second error rate, determining that transmission distortion is a cause of the first error rate exceeding the threshold error rate; and
responsively setting the output power for the transmitter below the first output power.

* * * * *

UNITED STATES PATENT AND TRADEMARK OFFICE
CERTIFICATE OF CORRECTION

| | | |
|---|---|---|
| PATENT NO. | : 7,869,408 B2 | Page 1 of 1 |
| APPLICATION NO. | : 10/779606 | |
| DATED | : January 11, 2011 | |
| INVENTOR(S) | : Seals et al. | |

It is certified that error appears in the above-identified patent and that said Letters Patent is hereby corrected as shown below:

Column 8, line 10, in Claim 15, delete "identifying," and insert -- identifying --.

Column 8, line 33, in Claim 17, delete "power," and insert -- power; --.

Signed and Sealed this
Twenty-fourth Day of May, 2011

David J. Kappos
*Director of the United States Patent and Trademark Office*